United States Patent
Wu et al.

(10) Patent No.: US 10,816,858 B2
(45) Date of Patent: Oct. 27, 2020

(54) ELECTRICALLY TUNABLE PHASE MODULATION ELEMENT

(71) Applicants: Liqxtal Technology Inc., Tainan (TW); HIMAX TECHNOLOGIES LIMITED, Tainan (TW)

(72) Inventors: Biing-Seng Wu, Tainan (TW); Hung-Shan Chen, Tainan (TW); Ming-Syuan Chen, Tainan (TW)

(73) Assignees: LIQXTAL TECHNOLOGY INC., Tainan (TW); HIMAX TECHNOLOGIES LIMITED, Tainan (TW)

( * ) Notice: Subject to any disclaimer, the term of this patent is extended or adjusted under 35 U.S.C. 154(b) by 86 days.

(21) Appl. No.: 16/172,879

(22) Filed: Oct. 29, 2018

(65) Prior Publication Data
US 2020/0133080 A1 Apr. 30, 2020

(51) Int. Cl.
*G02F 1/1343* (2006.01)
*G02F 1/1335* (2006.01)
*G02F 1/29* (2006.01)

(52) U.S. Cl.
CPC .. *G02F 1/134309* (2013.01); *G02F 1/133526* (2013.01); *G02F 1/29* (2013.01)

(58) Field of Classification Search
CPC ..... G02F 1/1333; G02F 1/134309; G02F 1/29
USPC ........................................................ 349/139
See application file for complete search history.

(56) References Cited

U.S. PATENT DOCUMENTS

| 4,408,837 | A | 10/1983 | Kozaki et al. |
| 2007/0046880 | A1* | 3/2007 | Shigeta ............. G02F 1/134336 349/138 |
| 2012/0019913 | A1* | 1/2012 | Nishimoto .......... C23C 14/0057 359/581 |
| 2016/0241217 | A1* | 8/2016 | Sazegar ................... H01Q 3/44 |
| 2018/0059490 | A1 | 3/2018 | Chen et al. |

FOREIGN PATENT DOCUMENTS

| CN | 102483605 B | 9/2015 |
| CN | 103294291 B | 9/2016 |
| CN | 107728401 A | 2/2018 |
| GB | 2064804 A | 6/1981 |
| GB | 2084343 A | 4/1982 |

(Continued)

OTHER PUBLICATIONS

Tobias Bocksrocker, et al."Efficient waveguide mode extraction in white organic light emitting diodes using ITO-anodes with integrated MgF2-columns," OSA Optics Express, Mar. 12, 2012, vol. 20, No. 6.

*Primary Examiner* — Charles S Chang
(74) *Attorney, Agent, or Firm* — CKC & Partners Co., LLC

(57) ABSTRACT

An electrically tunable optical phase modulation element includes a first substrate, a second substrate, a liquid crystal layer, a transparent layer, a first compensation layer. The second substrate is opposite to the first substrate. The liquid crystal layer is between the first substrate and the second substrate. The transparent layer is between the first substrate and the liquid crystal layer. The transparent layer has a first portion and a second portion. The first compensation layer is in between the first portion and the second portion of the transparent layer. The first compensation layer has a flat surface adjacent the liquid crystal layer.

13 Claims, 13 Drawing Sheets

(56) References Cited

FOREIGN PATENT DOCUMENTS

| | | |
|---|---|---|
| JP | 05-100201 A | 4/1993 |
| JP | 2018-091915 A | 6/2018 |
| WO | 2015136458 A4 | 9/2015 |
| WO | 2017/216716 A1 | 12/2017 |

* cited by examiner

ELECTRICALLY TUNABLE PHASE MODULATION ELEMENT

BACKGROUND

Field of Invention

The present disclosure relates to a phase modulation element, and more particularly to an electrically tunable optical phase modulation element.

Description of Related Art

Electrically tunable optical phase modulator includes an optoelectronic material layer (i.e., liquid crystal material) having refractive index tunable based on the electric field. By designing suitable shapes of electrodes, when a specific voltage(s) is applied thereon, a phase difference distribution of the optoelectronic material layer can be made to realize various optical effects. For example, the optoelectronic material layer can imitate an optical element, such as a lens, a grating, and a switch.

However, in the current design of electrodes for generating the electric field, a diffraction effect occurs since the electrodes and the gap therebetween show discontinuous refractive index distribution. The diffraction effect reduces the optical efficiency of the optical phase modulator. Furthermore, the electrodes have a non-flat surface topography, such that the optoelectronic material layer disposed on the non-flat surface may locally change the refractive index and induce the refractive index difference in the entire optoelectronic material layer, which in turn will enhance the diffraction effect. As such, there is a need for reducing the diffraction effect.

SUMMARY

According to one embodiment of the present disclosure, an electrically tunable optical phase modulation element includes a first substrate, a second substrate, a liquid crystal layer, a transparent layer, and a first compensation layer. The second substrate is opposite to the first substrate. The liquid crystal layer is between the first substrate and the second substrate. The transparent layer is between the first substrate and the liquid crystal layer. The transparent layer has a first portion and a second portion. The first compensation layer is in between the first portion and the second portion of the transparent layer, and the first compensation layer has a flat surface adjacent the liquid crystal layer.

In some embodiments of the present disclosure, the flat surface of the first compensation layer is coplanar with a surface of the patterned transparent layer adjacent the liquid crystal layer.

In some embodiments of the present disclosure, the electrically tunable optical phase modulation element further includes a second compensation layer over the first compensation layer and the transparent layer.

In some embodiments of the present disclosure, a layer of the first compensation layer adjacent to the second compensation layer is made of a material different from that of the second compensation layer.

In some embodiments of the present disclosure, a layer of the first compensation layer adjacent to the second compensation layer is made of a material the same as that of the second compensation layer.

In some embodiments of the present disclosure, the first compensation layer and the second compensation layer have an interface therebetween, and the interface is coplanar with a surface of the transparent layer adjacent the liquid crystal layer.

In some embodiments of the present disclosure, a surface of the first portion of the transparent layer is coplanar with a surface of the second portion of the transparent layer.

In some embodiments of the present disclosure, the first compensation layer comprises a plurality of layers, and at least two layers of the first compensation layer have different refractive indexes.

In some embodiments of the present disclosure, the transparent layer is made of a conductive material.

In some embodiments of the present disclosure, a difference between refractive indices of the compensation layer and the transparent layer in the application wavelength range is less than 0.1.

In some embodiments of the present disclosure, the first substrate has a first region where the transparent layer is located and a second region where the transparent layer is not located, and a difference between a reflectance of the electrically tunable optical phase modulation element at the first region and a reflectance of the electrically tunable optical phase modulation element at the second region is less than 0.1.

In some embodiments of the present disclosure, the electrically tunable optical phase modulation element further includes a patterned transparent conductive layer between the transparent layer and the substrate, wherein the patterned transparent conductive layer has a first electrode and a second electrode separated by a gap, and the first and second portions of the patterned transparent layer are over the first and second electrodes of the patterned transparent layer, respectively.

In some embodiments of the present disclosure, a difference between refractive indices of the compensation layer and the patterned transparent conductive layer in the application wavelength range is less than 0.1.

In some embodiments of the present disclosure, the first substrate has a first region where the patterned transparent conductive layer is located and a second region where the patterned transparent conductive layer is not located, and a difference between a reflectance of the electrically tunable optical phase modulation element at the first region and a reflectance of the electrically tunable optical phase modulation element at the second region is less than 0.1.

In some embodiments of the present disclosure, the electrically tunable optical phase modulation element further includes an anti-mosaic layer between the first substrate and the liquid crystal layer.

In some embodiments of the present disclosure, the electrically tunable optical phase modulation element further includes a counter transparent conductive layer between the second substrate and the liquid crystal layer.

Based on the above description, a diffraction effect is reduced by reducing the refractive index difference at different position. The diffraction effect is further relief by flattening the surface adjacent to the liquid crystal layer.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
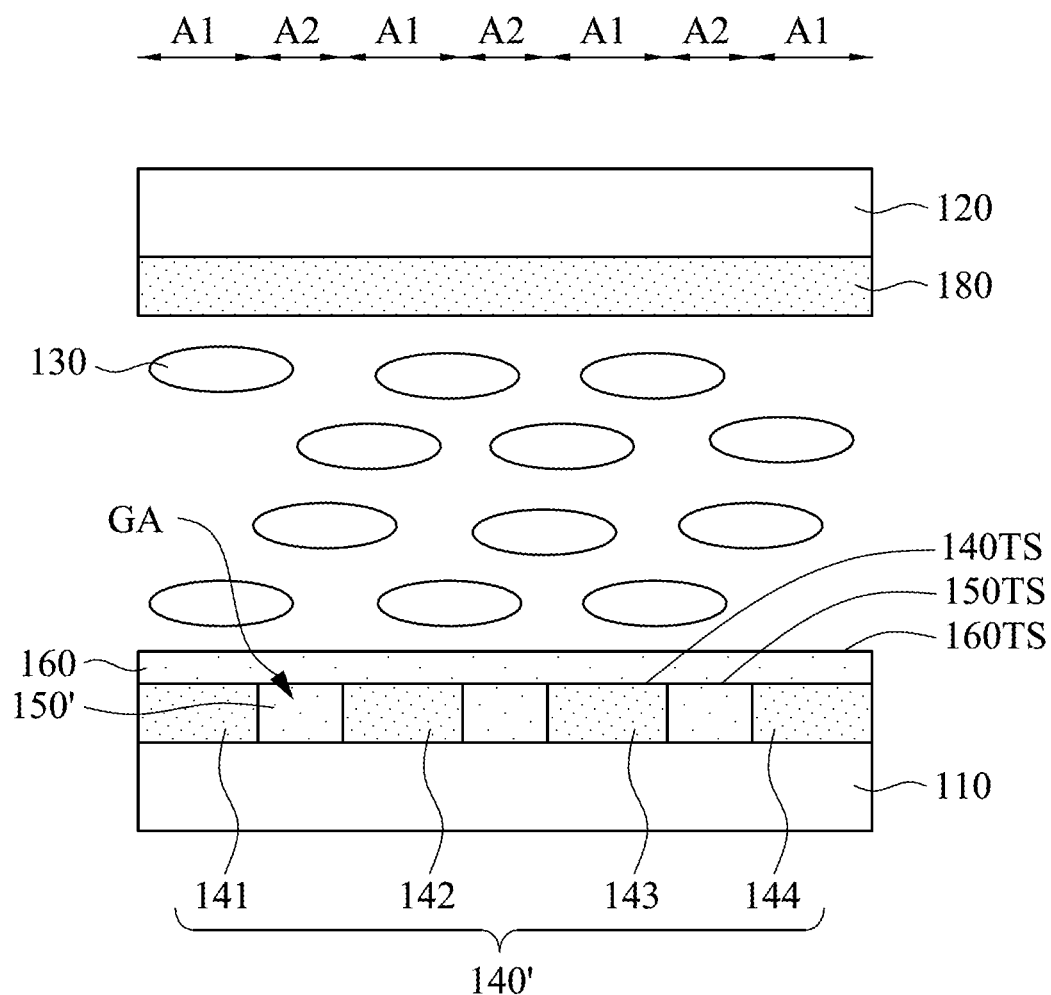
FIG. 1 is a schematic cross-sectional view of an electrically tunable optical phase modulation element according to a first embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic cross-sectional view of an electrically tunable optical phase modulation element 100 according to a first embodiment of the disclosure. The electrically tunable optical phase modulation element 100 includes a first substrate 110, a second substrate 120, a liquid crystal layer 130, a transparent layer 140', a compensation layer 150', a compensation layer 160, and a controller 170 (referring to FIGS. 2A-2C).

The first substrate 110 and the second substrate 120 are opposite to each other. The first substrate 110 and the second substrate 120 may be rigid and/or flexible substrates. For example, the first substrate 110 and the second substrate 120 are made of suitable transparent insulating materials, such as glass, quartz, or polymeric material. The liquid crystal layer 130 is between the first substrate 110 and the second substrate 120. In some embodiments of the present disclosure, a material of the liquid crystal layer 130 includes cholesteric liquid crystals, polymer-dispersed liquid crystals, blue-phase liquid crystals or nematic liquid crystals. However, the present disclosure is not limited thereto, and other suitable liquid crystal materials may be used.

The transparent layer 140' is between the first substrate 110 and the liquid crystal layer 130. In the present first embodiment, the transparent layer 140' may also be referred to as a patterned transparent conductive layer 140'. The patterned transparent conductive layer 140' may be made of suitable transparent conductive materials, such as indium tin oxide (ITO) or antimony tin oxide (ATO). To be specific, in the present embodiments, a transmittance of the patterned transparent conductive layer 140' is designed to be greater than 60%, preferably greater than 80%. Alternatively, in some other embodiments, the patterned transparent conductive layer 140' may be made of translucent electrodes. The patterned transparent conductive layer 140' may be patterned to have portions (i.e., electrodes 141-144), which may be spaced apart from each other, for example, by gaps GA. In some embodiments, the surfaces of the electrodes 141-144 are coplanar with each other, and referred to as surface 140TS.

The compensation layer 150' is in between two adjacent portions (i.e., electrodes 141-144) of the patterned transparent conductive layer 140'. For example, the compensation layer 150' fills at least one of the gap GA between the electrodes 141-142, the gap GA between the electrodes 142-143, and the gap GA between the electrodes 143-144. The compensation layer 150' is designed such that a difference between the refractive index of the compensation layer 150' and the patterned transparent conductive layer 140' in the application wavelength range is less than 0.1. Through the design, the refractive index from the electrode 141 to the electrode 144 remains substantially the same. That is, a combination of the patterned transparent conductive layer 140' and the compensation layer 150' at different locations has substantially the same effective refractive index. Through the configuration, a diffraction effect induced by the refractive index difference of the electrodes 141-144 and the gaps GA can be reduced or eliminated.

For example, when the electrically tunable optical phase modulation element 100 operates at 590 nanometers, the refractive index of the patterned transparent conductive layer 140' is about 1.9, and the refractive index of the compensation layer 150' is designed to be in a range of 1.8 to 2 at 590 nanometers. In some embodiments, the application wavelength range may range from 300 to 1570 nanometers depending on the actual application. For example, the application wavelength range may be visible light (e.g., 400 nanometers to 700 nanometers) when the electrically tunable optical phase modulation element 100 is used for human eyes, such as displays or liquid crystal lenses. Alternatively, the application wavelength range may be optical communication wavelength (e.g., 850 nanometers to 1550 nanometers), when used with optic fibers.

Furthermore, the compensation layer 150' has a flat surface 150TS adjacent the liquid crystal layer 130. The flat surface 150TS of the compensation layer 150' is coplanar with the surface 140TS of the patterned transparent conductive layer 140'. In some embodiments, the compensation layer 160 may be optionally formed over the flat surface 150TS of the compensation layer 150' and the surface 140TS of the patterned transparent conductive layer 140', and therefore has a flat surface 160TS. Through the configuration of the flat surfaces, molecule distribution of the liquid crystal layer 130 is prevented from being influenced by the topography of the patterned transparent conductive layer 140', such that the refractive index of the liquid crystal layer 130 is not locally changed by the surface topography of the patterned transparent conductive layer 140'. As a result, the diffraction effect would not be enhanced by the surface topography of the patterned transparent conductive layer 140.

The terms "coplanar" as used in this context have a relative meaning with respect to the application of the liquid crystal element. For example, if the liquid crystal element can tolerate a step height difference of 5 nm, then it is coplanar. For example, if a height difference between a first surface (e.g. the flat surface 150TS) and a second surface (e.g., the surface 140TS) is less than 5 nm, the first and second surfaces (e.g., the surfaces 140TS and 150TS) are coplanar. The term "coplanar" could also mean a substantially smooth transition from a first surface (e.g. the flat surface 150TS) to a second surface with (e.g., the surface 140TS) no abrupt step. The smooth transition can be roughly defined as a surface with no acute angles, to enable the enhanced reliability of the liquid crystal element.

The compensation layers 150' and 160 may be form of suitable transparent dielectric materials, such as $Ta_2O_5$, $TiO_2$, and $SiO_2$. The materials of the compensation layers 150' and 160 may be the same or different. In some embodiments, a transmittance of the compensation layers 150' and 160 is greater than 60%, preferably greater than 80%. In some embodiments, unlike the compensation layer 150', the compensation layer 160 has a uniform thickness, and the refractive index of the compensation layer 160 may be designed regardless of the refractive index of the electrodes 141-144. The refractive index of the compensation layer 160 may be designed for index mismatch between the electrodes 141-144 and the liquid crystal layer 130, and the difference between the refractive index of the compensation layer 160 and the refractive index of the electrodes 141-144 in the application wavelength range may be designed to be greater than 0.1.

In the present embodiments, the patterned transparent conductive layer 140' and the liquid crystal layer 130 are designed, such that an effective refractive index of the liquid crystal layer 130 at each different positions will vary depending on the voltage applied onto the patterned transparent conductive layer 140'. In some embodiments of the present disclosure, the controller 170 (referring to FIGS. 2A-2C) is electrically connected to at least one of the electrodes 141-144 of the patterned transparent conductive layer 140'. The controller 170 (referring to FIGS. 2A-2C) may provide suitable voltages to the electrodes 141-144, and through the control of the electrical field distribution, the liquid crystal layer 130 may operate to have the desired effect in the optically active region, such as a lens effect or a diffraction grating effect.

Figure 2C:
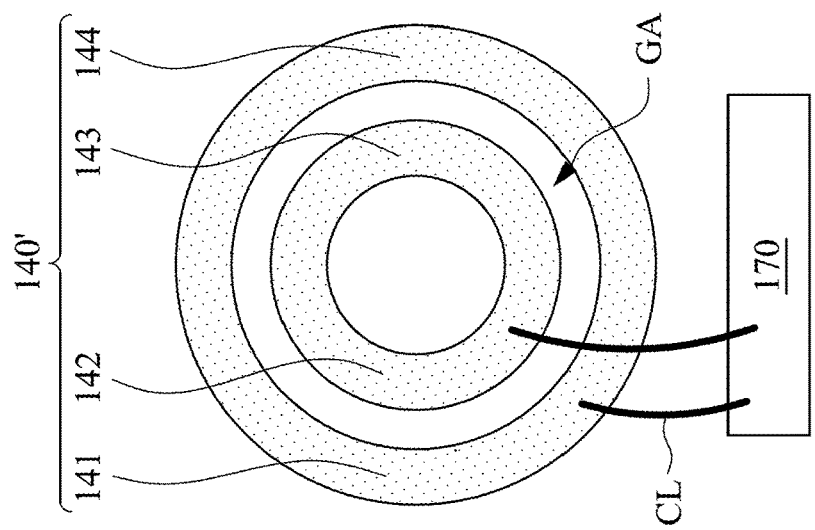
FIGS. 2A-2C illustrates top views of the patterned transparent conductive layer according to various examples.
Figure 2B:
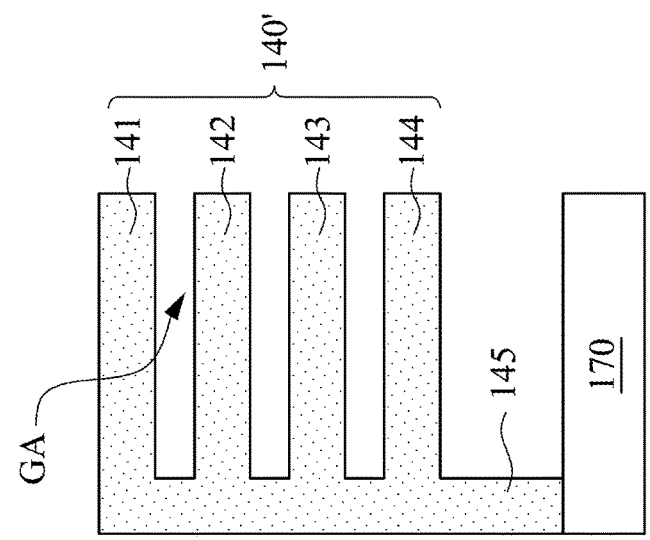
Figure 2A:
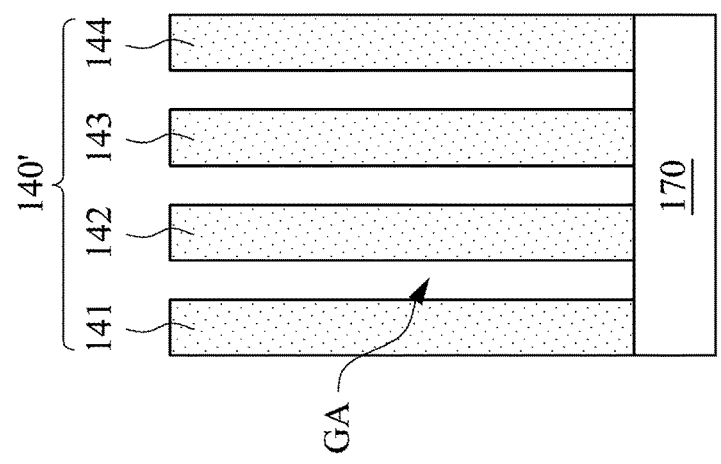

FIGS. 2A-2C illustrates top views of the patterned transparent conductive layer 140' according to various examples. Reference is made to FIG. 1 and FIGS. 2A-2C. For example, as shown in FIGS. 2A and 2B, the electrodes 141-144 may be striped. The striped electrodes 141-144 may be configured to control a phase retardation and realize a prism or a lenticular lens. As shown in FIG. 2A, the striped electrodes 141-144 may be disconnected from each other, such that the controller 170 provides suitable voltages to the electrodes 141-144 respectively. In some other embodiments, as shown in FIG. 2B, at least two of the striped electrodes 141-144 are connected to the controller 170 by a trunk electrode 145, such that the controller 170 provide the same voltage to the electrodes 141-144.

In some examples, as shown in FIG. 2C, the electrodes 141-144 are circular so as to provide a lens effect and realize a liquid crystal lens. As shown in FIG. 2C, the electrodes 141 and 144 are connected, the electrodes 142 and 143 are connected, and the electrodes 141 and 144 are disconnected from the electrodes 142 and 143. In some examples, the electrodes 141 and 144 are provided with a first voltage, the electrodes 142 and 143 are provided with a second voltage greater than the first voltage, such that a non-uniform electrical field is created, and a phase difference distribution of the liquid crystal layer 130 can imitate that of a lens.

It is noted that the pattern of the patterned transparent conductive layer 140' or the arrangement of the electrodes 141-144 shown in the figures should not limit the scope of the present disclosure; the patterned transparent conductive layer 140' may be designed according to actual requirements.

In some embodiments, the controller 170 may be suitable software or hardware. For example, the controller 170 may be application-specific integrated circuit (ASIC), advanced (reduced instruction set computing (RISC) machine (ARM), central processing unit (CPU), single integrated circuit device, or other devices suitable for performing calculation or executing commands. The exemplary devices should not limit the scope of the present disclosure.

Reference is made back to FIG. 1. The electrically tunable optical phase modulation element 100 may optionally includes a counter transparent conductive layer 180 between the second substrate 120 and the liquid crystal layer 130. The counter transparent conductive layer 180 may be made of the same material as that of the patterned transparent conductive layer 140'. The counter transparent conductive layer 180 may be made of suitable transparent conductive materials, such as ITO or ATO. In some other embodiments, the counter transparent conductive layer 180 may be omitted.

In some embodiments, the first substrate 110 has a first region A1 where the transparent layer 140' is located and a second region A2 where the transparent layer 140' is not located, and the first and second regions A1 and A2 are both in the optically active region of the electrically tunable optical phase modulation element 100. In some embodiments, a difference between a reflectance of the electrically tunable optical phase modulation element 100 at the first region A1 and a reflectance of the electrically tunable optical phase modulation element 100 at the second region A2 is less than 0.1. For example, in the present embodiments, a combination of the substrates 110 and 120, the liquid crystal layer 130, the transparent layer 140', the compensation layer 150', the compensation layer 160, the counter transparent conductive layer 180, and other layers (e.g., alignment layers) at different locations (e.g., the regions A1 and A2) have reflectances with a variation less than 0.1.

FIGS. 3A-3G are cross-sectional views illustrating various intermediate steps of a method for fabricating an electrically tunable optical phase modulation element 100 according to some embodiments of the disclosure.

Figure 3A:
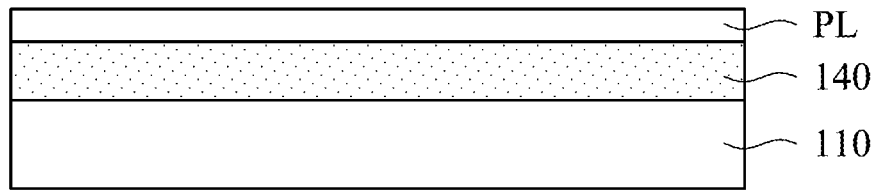
FIGS. 3A-3G are cross-sectional views illustrating various intermediate steps of a method for fabricating an electrically tunable optical phase modulation element according to some embodiments of the disclosure.

Referring to FIG. 3A, a transparent conductive layer 140' is disposed over a first substrate 110. As aforementioned, the transparent conductive layer 140' is made of suitable transparent conductive materials, such as ITO or ATO. A photoresist layer PL is then coated over the transparent conductive layer 140. The photoresist layer PL may include positive photoresist or negative photoresist. For example, the photoresist layer PL may be made of light-sensitive organic material, such as polymers.

Figure 3B:
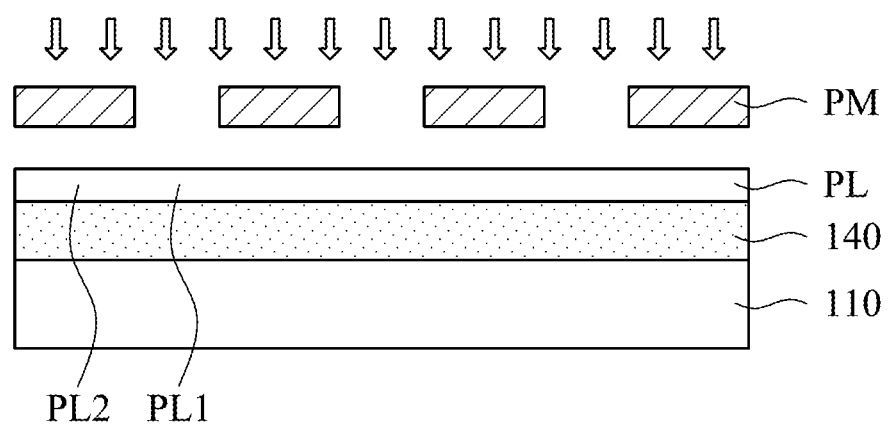

Referring to FIG. 3B, a patterned mask PM is then formed over or above the photoresist layer PL and mask a portion of the photoresist layer PL (e.g., masked regions PL2). Through the configuration of the photoresist layer PL, unmasked regions PL1 of the photoresist layer PL is exposed to a light, while the masked regions PL2 of the photoresist layer PL are free of the irradiation of the light.

Figure 3C:
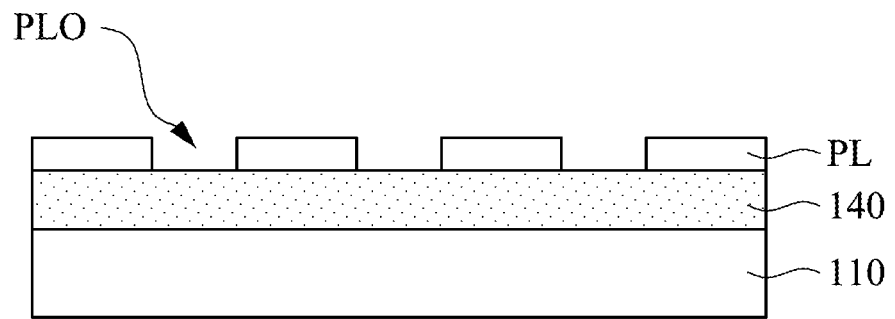

Referring to FIG. 3C, a developer is then applied to the photoresist layer PL. In the case of a positive photoresist, the photoresist layer PL is degraded by light and the developer will dissolve away the unmasked regions PL1 of the photoresist layer PL (referring to FIG. 3B), leaving behind the mask regions PL2 of the photoresist layer PL (referring to FIG. 3B). The remaining photoresist layer PL (i.e., the mask regions PL2 of the photoresist layer PL in FIG. 3B) has openings PLO exposing portions of the transparent conductive layer 140.

Figure 3D:
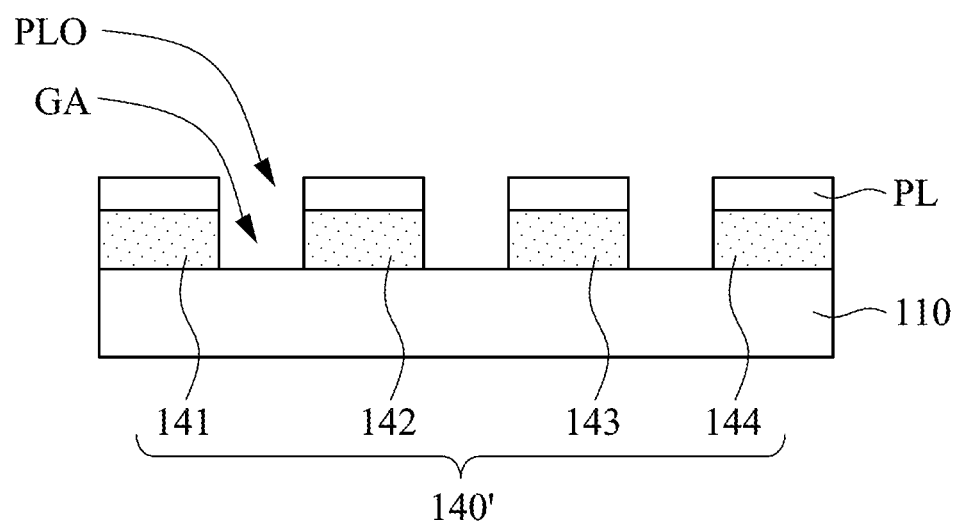

Referring to FIG. 3D, an etchant is applied to etch away the exposed portions of the transparent conductive layer 140 (referring to FIG. 3C), such that the transparent conductive layer 140 (referring to FIG. 3C) is patterned into a patterned transparent conductive layer 140'. The patterned transparent conductive layer 140' includes the remaining portions 141-144, and gaps GA are formed therebetween. The photoresist layer PL has a higher etch resistance to the etchant than that of the transparent conductive layer 140'. Due to the protection of the photoresist layer PL, the patterned transparent conductive layer 140' (i.e., the portions 141-144) remains intact. It is noted that the photoresist layer PL also remains intact over the patterned transparent conductive layer 140', while portions of the first substrate 110 are exposed by the gaps GA of the patterned transparent conductive layer 140' and openings PLO of the photoresist layer PL.

Figure 3E:
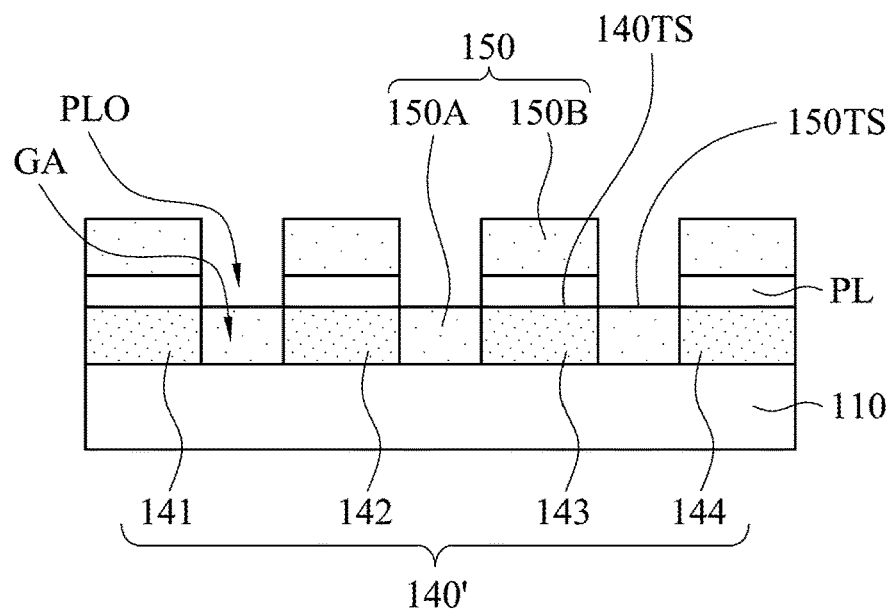

Referring to FIG. 3E, a compensation layer 150 is conformally formed over the structure shown in FIG. 3D. Herein, due to presence of the patterned transparent conductive layer 140', a surface where the compensation layer 150 is to be formed is not smooth. As a result, the compensation layer 150 has first portions 150A respectively in the gaps GA and second portions 150B respectively over the photoresist layer PL.

In some embodiments, a thickness of the compensation layer 150 is tuned to be substantially equal to the depth of the gaps GA, such that a surface 150TS of the first portion 150A of the compensation layer 150 is coplanar with a surface 140TS of the patterned transparent conductive layer 140'. However, it should not limit the scope of the present embodiments, in some other embodiments, the thickness of the compensation layer 150 may be different from the depth of the gaps GA, such that the compensation layer 150 may overfill the gaps GA or not fill the gaps GA.

Figure 3F:
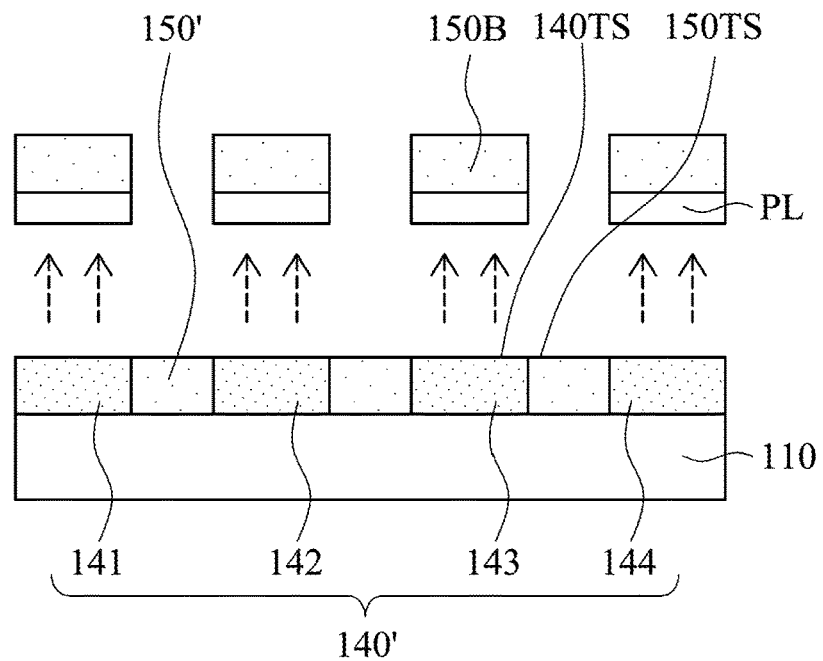

Referring to FIG. 3F, the photoresist layer PL is stripped off from the patterned transparent conductive layer 140', and therefore the second portions 150B of the compensation layer 150 thereon are also removed. The first portion 150A of the compensation layer 150 remains intact and is also referred to as the compensation layer 150' hereinafter.

In some embodiments where the thickness of the compensation layer 150 is well tuned to be substantially equal to the depth of the gaps GA, the surface 150TS of the compensation layer 150' is coplanar with the surface 140TS of the patterned transparent conductive 140'.

In some other embodiments where the thickness of the compensation layer 150 is different from the depth of the gaps GA, a chemical-mechanical polish (CMP) process may be optionally performed to planarize the surface 150TS of the compensation layer 150' with the surface 140TS of the patterned transparent conductive layer 140'.

Figure 3G:
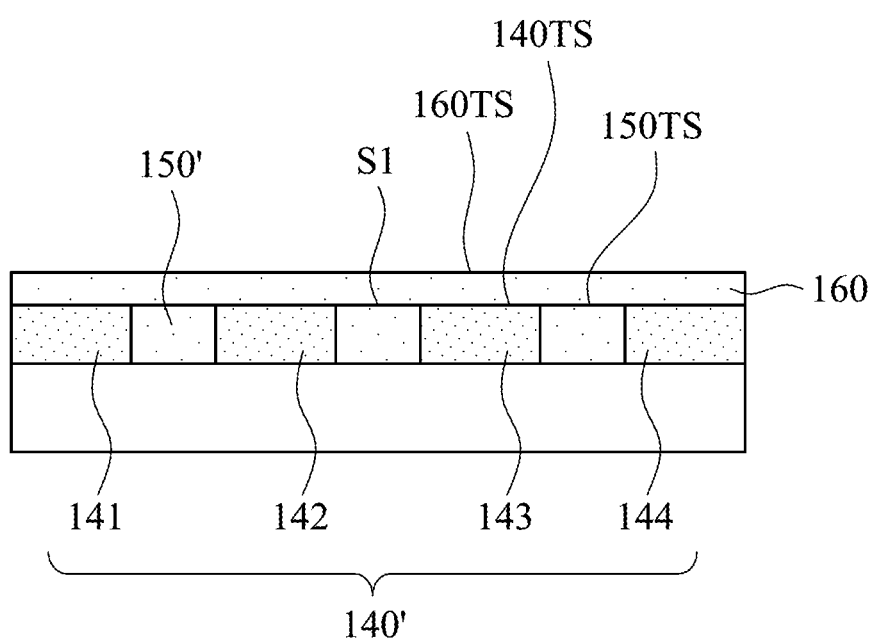

Referring to FIG. 3G, a compensation layer 160 may be conformally formed over the structure shown in FIG. 3F. The compensation layers 150' and 160 are in an overlaying relationship. In some embodiments, since the surface 150TS of the compensation layer 150' is coplanar with the surface 140TS of the patterned transparent conductive layer 140, the compensation layer 160 formed thereon also has a flat surface 160TS.

Each of the compensation layers 150' and 160 may include one or more than one layers, and each of the layers of the compensation layers 150' and 160 may include the same or different materials. For example, materials for the layers of the compensation layers 150' and 160 may be $Ta_2O_5$, $TiO_2$, and $SiO_2$. In some embodiments, the compensation layers 150' and 160 are made of the same material. In some other embodiments, the compensation layers 150' and 160 are made of different materials.

In some embodiments, since the compensation layers 150' and 160 are formed in different steps, there may be an interface S1 between the compensation layers 150' and 160. The interface S1 may be coplanar with the surface of the patterned transparent conductive layer 140'. In some embodiments where the compensation layers 150' and 160 are made of the same material, the interface therebetween may not be perceived easily. In some embodiments where the compensation layers 150' and 160 are made of the different materials, the interface S1 therebetween may be perceived easily. It is noted that the configuration of the compensation layer 160 is not necessary, and in some other embodiments, the compensation layer 160 may be omitted.

Figure 4:
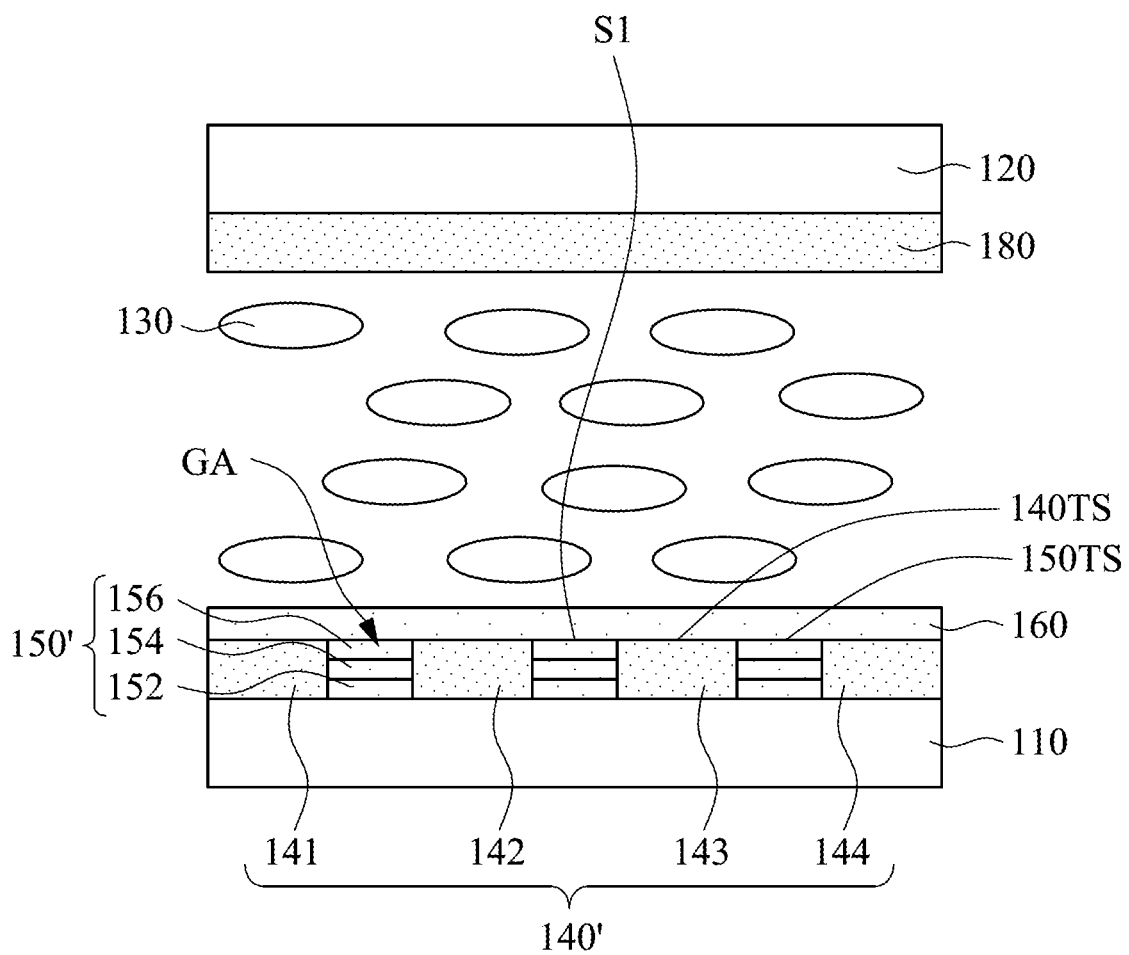
FIG. 4 is a schematic cross-sectional view of an electrically tunable optical phase modulation element according to a second embodiment of the disclosure.

FIG. 4 is a schematic cross-sectional view of an electrically tunable optical phase modulation element 100 according to a second embodiment of the present disclosure. The second embodiment is similar to the first embodiment of FIG. 1, and the difference between the second embodiment and the first embodiments of FIG. 1 is that: the compensation layer 150' of the second embodiment include plural layers 152-156. For better illustration, the refractive index of the patterned transparent conductive layer 140 may be referred to as $n_{ito}$ in this context. Herein, an effective refractive index of the layers 152-156 in the application wavelength range is substantially equal to $n_{ito}$ with a tolerance of 0.1. In further embodiments, the tolerance may be less than 0.1, for example, 0.08 or 0.05. That is, the effective refractive index of the layers 152-156 in the application wavelength range is in a range of ($n_{ito}$−0.1) to ($n_{ito}$+0.1). In some other embodiments, the refractive indexes of each of the layers 152-156 in the application wavelength range are in a range of ($n_{ito}$−0.1) to ($n_{ito}$+0.1).

In some embodiments, the layers 152-156 and the compensation layer 160 may be made of different materials for index matching. In some embodiments, the refractive indexes of the layers 152-156 and the compensation layer 160 may decrease from the first substrate 110 toward the liquid crystal layer 130. Alternatively, in some embodiments, the refractive indexes of the layers 152-156 and the compensation layer 160 may increase from the first substrate 110 toward the liquid crystal layer 130. In some other embodiments, at least one of the layers 152-156 of the compensation layers 150' may have the same material as that of the compensation layer 160. In some embodiments where the layer of the compensation layers 150' adjacent the compensation layers 160 (e.g., the layer 156) is made of the same material as that of the compensation layer 160, the interface S1 therebetween may not be perceived easily. In some embodiments where the layer of the compensation layers 150' adjacent the compensation layers 160 (e.g., the layer 156) is made of the material different form that of the compensation layer, the interface S1 therebetween may be perceived easily. Other details of the present embodiments are similar to those aforementioned, and not repeated herein.

Figure 5:
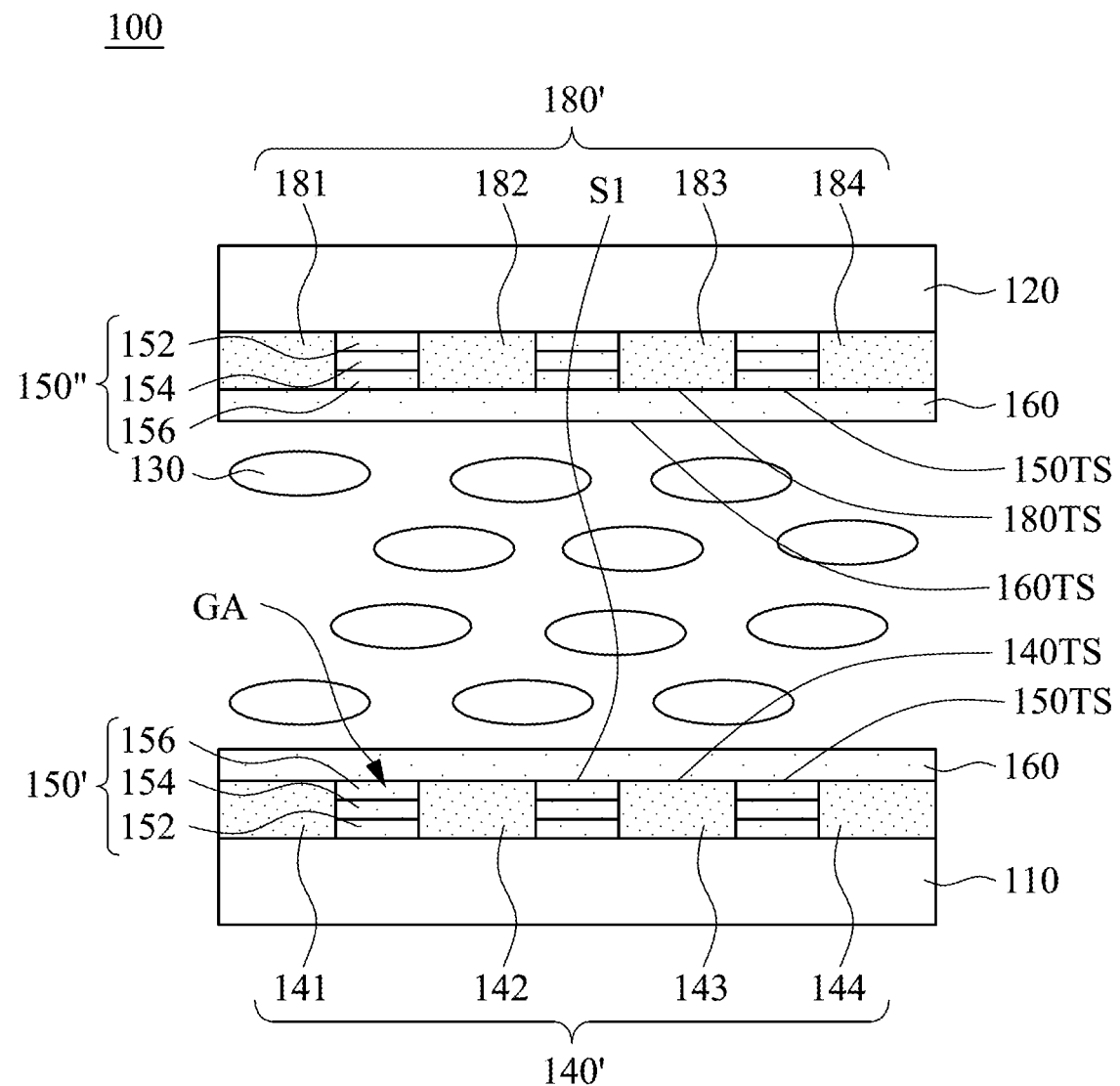
FIG. 5 is a schematic cross-sectional view of an electrically tunable optical phase modulation element according to a third embodiment of the disclosure.

FIG. 5 is a schematic cross-sectional view of an electrically tunable optical phase modulation element 100 according to a third embodiment of the disclosure. The third embodiment is similar to the first embodiment of FIG. 1, and the difference between the third embodiment and first embodiment of FIG. 1 is that: in the third embodiment, the counter transparent conductive layer 180 is patterned and referred to as the counter transparent conductive layer 180', and, the electrically tunable optical phase modulation element 100 further includes another compensation layer 150" on the substrate 120.

To be specific, the patterned transparent conductive layer 180' may have portions (i.e., electrodes 181-184) spaced apart from each other. The compensation layer 150' is in between two adjacent portions (i.e., electrodes 181-184) of the patterned transparent conductive layer 180'. As the configuration of the compensation layer 150', the compensation layer 150" has a surface 150TS coplanar with a surface 180TS of the electrodes 181-184, thereby providing a flat surface topography. In some embodiments, another compensation layer 160 may be optionally formed over the flat surface 150TS of the compensation layer 150' and the surface 140TS of the patterned transparent conductive layer 140', and therefore has a flat surface 160TS. The structural and material configuration of the elements (e.g., the compensation layer 150" and the compensation layer 160) on the substrate 120 is substantially the same as that of the elements (e.g., the compensation layer 150' and the compensation layer 160) on the substrate 110, and therefore not repeated herein. Other details of the third embodiment are similar to those aforementioned, and therefore not repeated herein.

Figure 6:
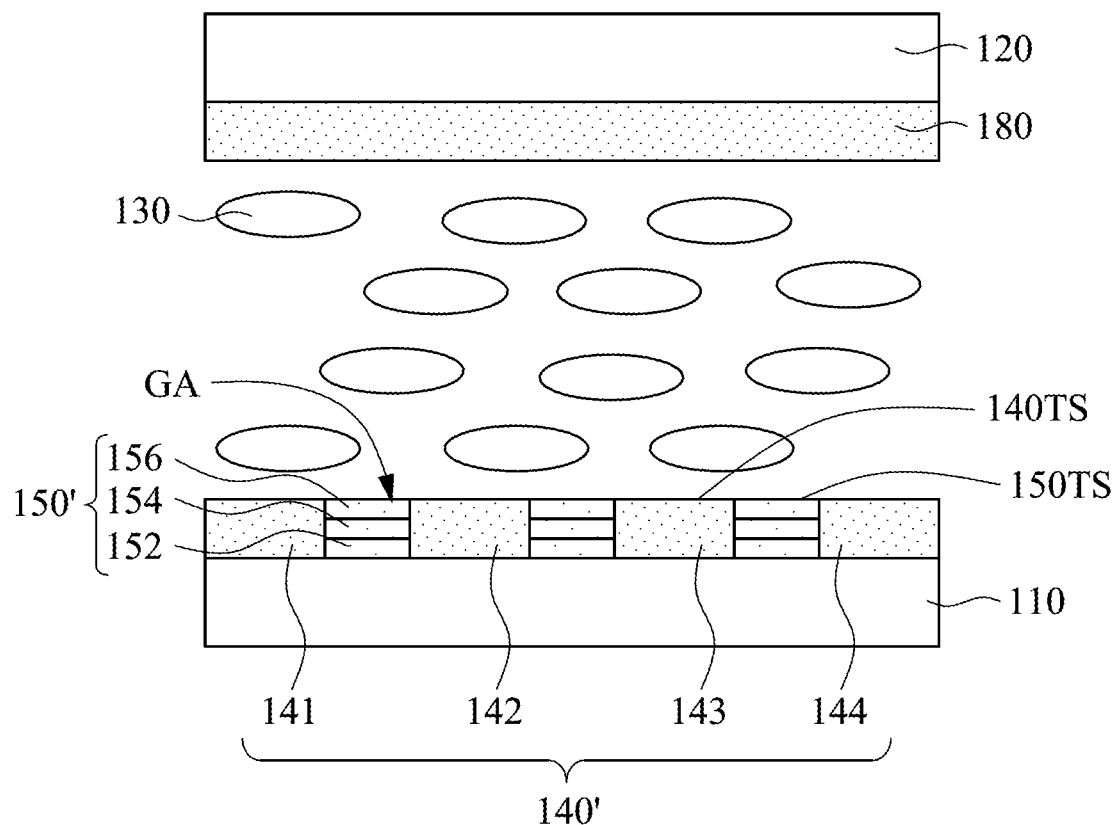
FIG. 6 is a schematic cross-sectional view of an electrically tunable optical phase modulation element according to a fourth embodiment of the disclosure.

FIG. 6 is a schematic cross-sectional view of an electrically tunable optical phase modulation element 100 according to a fourth embodiment of the disclosure. The fourth embodiment is similar to the first embodiment of FIG. 1, and the difference between the fourth embodiment and first embodiment of FIG. 1 is that: in the fourth embodiment, the compensation layer 160 is omitted, and the surface 150TS of the compensation layer 150' is flat and coplanar with a surface 140TS of the patterned transparent conductive layer 140 adjacent the liquid crystal layer 130. Other details of the fourth embodiment are similar to those aforementioned, and not repeated herein.

Figure 7:
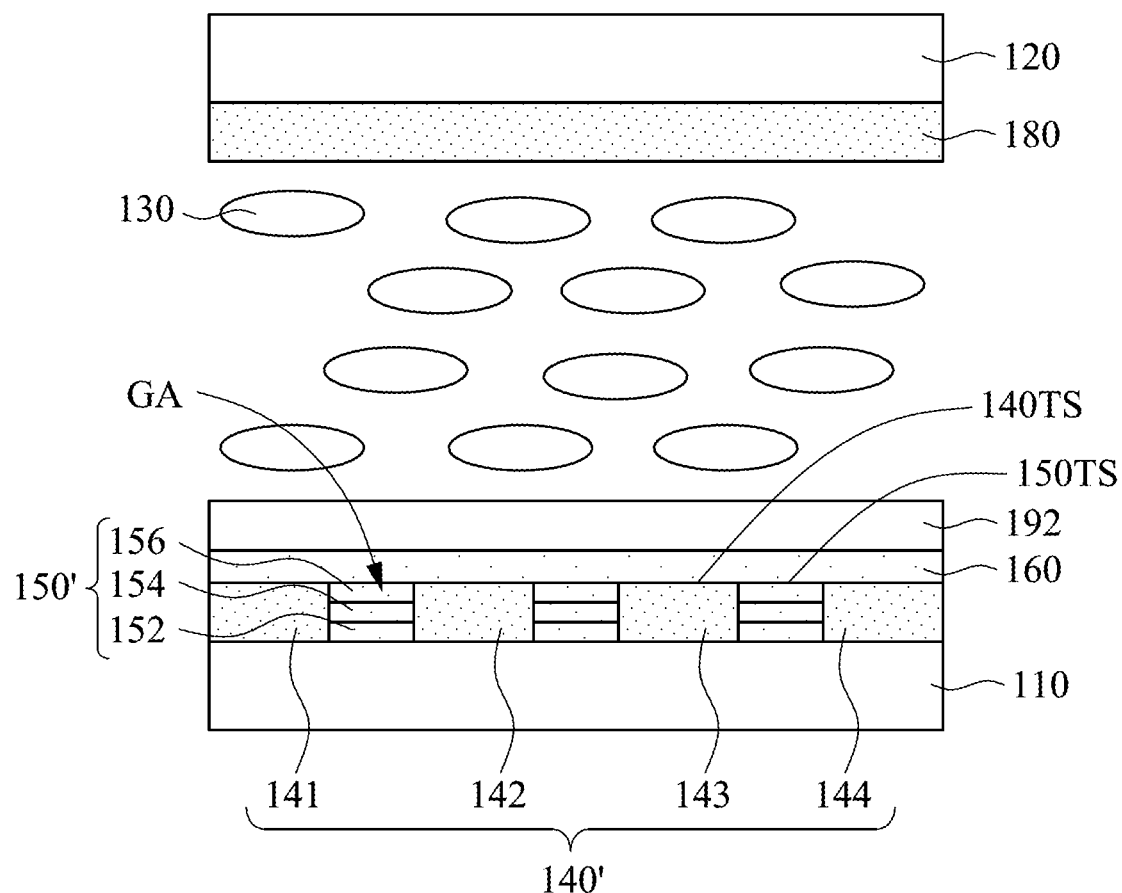
FIG. 7 is a schematic cross-sectional view of an electrically tunable optical phase modulation element according to a fifth embodiment of the disclosure.

FIG. 7 is a schematic cross-sectional view of an electrically tunable optical phase modulation element 100 according to a fifth embodiment of the disclosure. The fifth embodiment is similar to the first embodiment of FIG. 1, and the difference between the fifth embodiment and the first embodiment of FIG. 1 is that: in the fifth embodiments, the electrically tunable optical phase modulation element 100 further includes an anti-mosaic layer 192, which is made of dielectric or semiconductor materials. For example, the anti-mosaic layer 192 may include a metal-containing compound, such as oxides of titanium, zinc, tin, or indium. The anti-mosaic layer 192 is between the liquid crystal layer 130 and the compensation layer 150'. The anti-mosaic layer 192 may smooth the electric field generated by the electrodes 141-144, thereby achieving better performance, such as better lens effect.

In the present embodiments, the anti-mosaic layer 192 is a single layer that cover the optically active region entirely. However, the disclosure is not limited thereto, and in some other embodiments, the anti-mosaic layer 192 may be patterned in accordance with the pattern of the electrodes 141-144. For example, the anti-mosaic layer 192 may be patterned into a stripe form or a circular form. Other details of the fourth embodiment are similar to those aforementioned, and not repeated herein.

Figure 8:
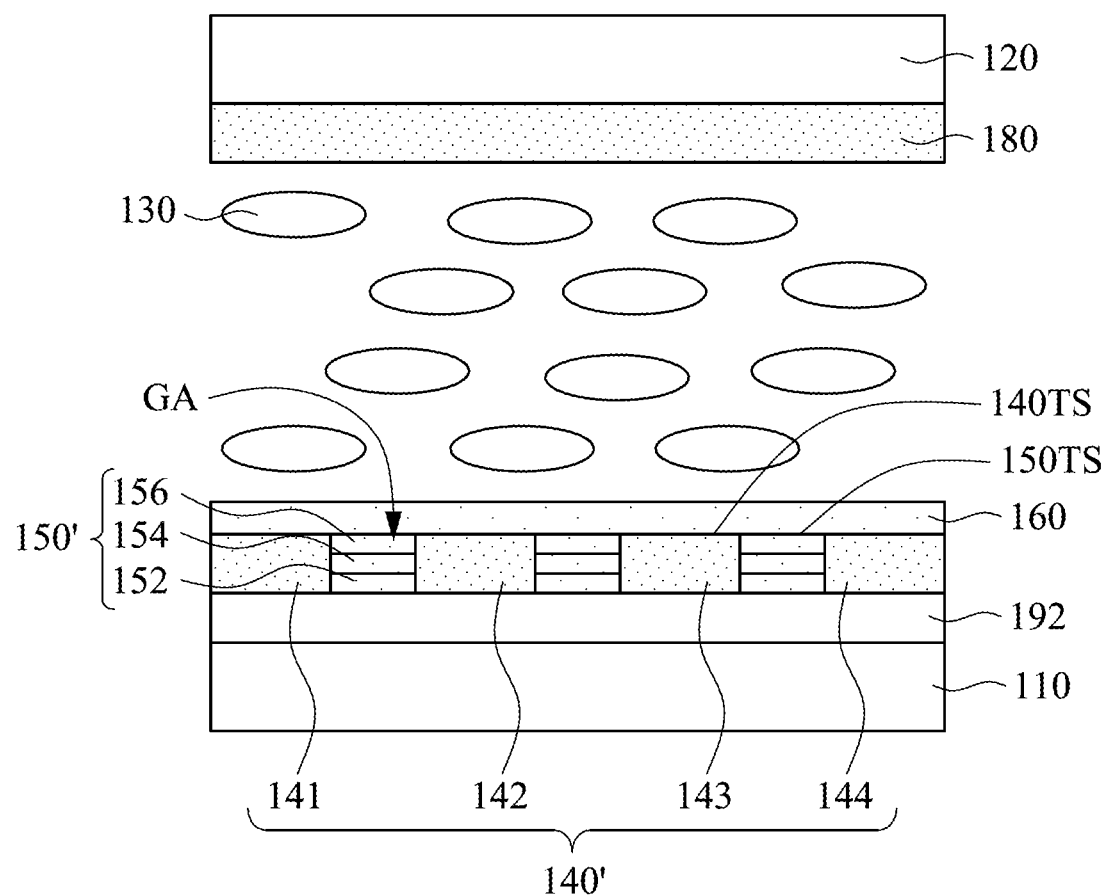
FIG. 8 is a schematic cross-sectional view of an electrically tunable optical phase modulation element according to a sixth embodiment of the disclosure.

FIG. 8 is a schematic cross-sectional view of an electrically tunable optical phase modulation element 100 according to a sixth embodiment of the disclosure. The sixth embodiment is similar to the first embodiment of FIG. 1, and the difference between the sixth embodiment and the first embodiment of FIG. 1 is that: in the sixth embodiments, the electrically tunable optical phase modulation element 100 further includes an anti-mosaic layer 192. The anti-mosaic layer 192 is between the first substrate 110 and the compensation layer 150'. The materials and functions of the anti-mosaic layer 192 may be the same as those in the fourth embodiments. Other details of the fifth embodiments are similar to those aforementioned and not repeated herein.

Figure 9:
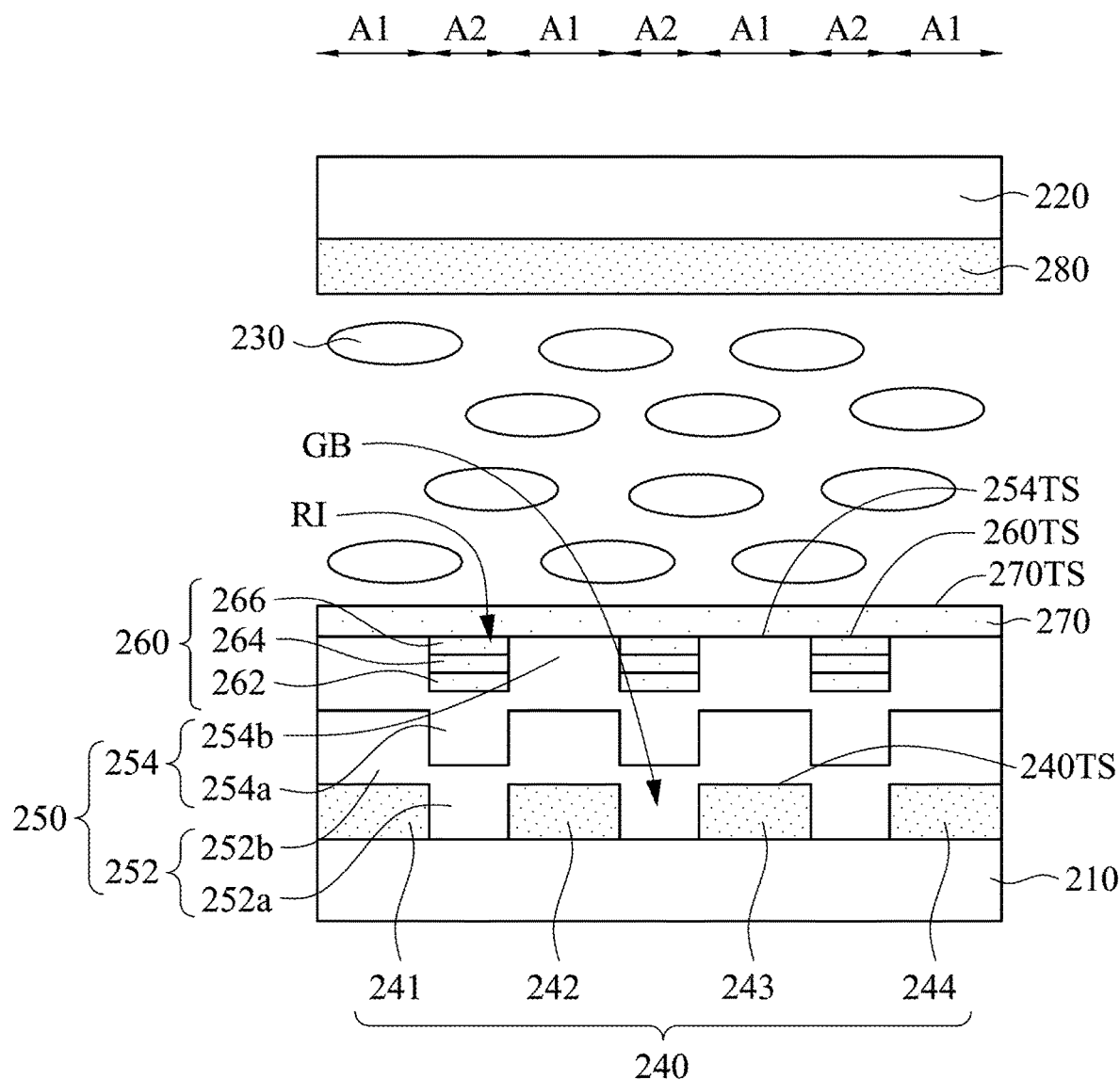
FIG. 9 is a schematic cross-sectional view of an electrically tunable optical phase modulation element according to a seventh embodiment of the disclosure.

FIG. 9 is a schematic cross-sectional view of an electrically tunable optical phase modulation element 200 according to a seventh embodiment of the disclosure. The electrically tunable optical phase modulation element 200 includes a first substrate 210, a second substrate 220, a liquid crystal layer 230, a patterned transparent conductive layer 240, a transparent layer 250, a compensation layer 260, and a controller (not shown). As mentioned in the first embodiment, the first substrate 210 and the second substrate 120 are opposite to each other. The liquid crystal layer 230 is between the first substrate 210 and the second substrate 220. The patterned transparent conductive layer 240 is between the liquid crystal layer 230 and the first substrate 210. Through the control of the electrical field distribution, the liquid crystal layer 330 may operate to have the desired effect in the optically active region, such as a lens effect or a diffraction grating effect.

In the present embodiments, the transparent layer 250 is between the liquid crystal layer 230 and the patterned transparent conductive layer 240. A transmittance of the transparent layer 250 may be designed to be greater than 60%, preferably greater than 80%. The transparent layer 250 may have a surface topography corresponding to that of the patterned transparent conductive layer 240. For example, while the patterned transparent conductive layer 240 has electrodes 241-244, the transparent layer 250 has portions 254b corresponding to the electrodes 241-244. In some embodiments, the surfaces of the electrodes 241-244 are coplanar with each other, and referred to as surface 240TS, and the surfaces of the portions 254b are coplanar with each other, and referred to as a surface 254TS. Herein, the transparent layer 250 may be conformally formed over the patterned transparent conductive layer 240, such that the gaps GB between the electrodes 241-244 may have the same depth as that of the gaps R1 between the portions 254b. However, in some other embodiments, the transparent layer 250 may not be conformally formed, and therefore the gaps GB and the gaps R1 may have different depths.

The compensation layer 260 is in between two adjacent portions (i.e., portions 254b) of the transparent layer 250. For example, the compensation layer 260 fills at least one of the gaps R1 between the portions 254b. The compensation layer 260 is designed such that a difference between the refractive index of the compensation layer 260 in an application wavelength range and a refractive index of the patterned transparent conductive layer 240 in the application wavelength range is less than 0.1. Through the design, the refractive index from the electrode 241 to the electrode 244 remains substantially the same. That is, a combination of the patterned transparent conductive layer 240, the transparent layer 250, and the compensation layer 260 at different locations has substantially the same effective refractive index. Through the configuration, a diffraction effect induced by the refractive index difference of the electrodes 241-244 and the gaps GB can be relieved or eliminated.

Furthermore, the compensation layer 260 has a flat surface 260TS adjacent the liquid crystal layer 230. The flat surface 260TS is coplanar with a surface 254TS of the portions 254b of the transparent layer 250 adjacent the liquid crystal layer 230. Through the configuration, molecule distribution of the liquid crystal layer 230 is prevented from being influenced by the topography of the patterned transparent conductive layer 240, such that the refractive index of the liquid crystal layer 230 is not locally changed by the surface topography of the patterned transparent conductive layer 240. As a result, the diffraction effect would not be enhanced by the surface topography of the patterned transparent conductive layer 240.

As illustrated above, if a height difference between a first surface (e.g. the flat surface 254TS) and a second surface (e.g., the surface 260TS) is less than 5 nm, the first and second surfaces (e.g., the surfaces 254TS and 260TS) are coplanar.

In some embodiments, the transparent layer 250 may include plural layers, which may be made of the same or different materials. For example, herein, the transparent layer 250 has interlayers 252 and 254, which are conformally formed over the patterned transparent conductive layer 240. To be specific, the interlayer 252 has first portions 252*a* between the electrodes 241-244 and second portions 252*b* over the electrodes 241-244. The first portions 252*a* connect two adjacent second portions 252*b* with each other, and the first portions 252*a* and the second portions 252*b* may have the same thickness. The interlayer 254 is conformally formed over the interlayer 252, in which the interlayer 254 has first portions 254*a* in between the second portions 252*b* and second portions 254*b* over the second portions 252*b*. The first portions 254*a* connect two adjacent second portions 254*b* with each other, and the first portions 254*a* and the second portions 254*b* may have the same thickness. The interlayers 252 and 254 may be made of suitable transparent dielectric materials, such as $Ta_2O_5$, $TiO_2$, and $SiO_2$. In some embodiments, a transmittance of each of the interlayers 252 and 254 is designed to be greater than 60%, preferably greater than 80%.

In some embodiments, the electrically tunable optical phase modulation element 200 includes a compensation layer 270 over the surface 260TS and the surface 250TS, and therefore has a flat surface 270T adjacent the liquid crystal layer 230. Each of the compensation layers 260 and 270 may include one or more than one layers, and each of the layers of the compensation layers 260 and 270 may include the same or different materials. In some embodiments, the compensation layers 260 and 270 are made of the same material. In some other embodiments, the compensation layers 260 and 270 are made of different materials. For example, the compensation layer 260 may include layers 262-266 made of different materials.

In the present embodiments, the compensation layers 260 and 270 and the interlayers 252 and 254 may be formed by CVD, PVD, coating, or other suitable deposition process. The interlayers 252 and 254 may be made of aforementioned suitable dielectric materials. The interlayers 252 and 254 may be made of the same or different materials. The method for forming the compensation layers 260 and 270 is similar to those illustrated in FIG. 3A-3G, and not repeated herein.

The configurations and materials of the first substrate 210, the second substrate 220, the liquid crystal layer 230, and the patterned transparent conductive layer 240 are the same as the first substrate 110, the second substrate 120, the liquid crystal layer 130, and the patterned transparent conductive layer 140 in the first embodiment of FIG. 1, and therefore not repeated herein. The materials of the compensation layers 260 and 270 are the same as the compensation layers 150' and 160 in the first embodiment of FIG. 1, and therefore not repeated herein.

In some embodiments, the first substrate 210 has a first region A1 where the patterned transparent conductive layer 240 is located and a second region A2 where the patterned transparent conductive layer 240 is not located, and the first and second regions A1 and A2 are both in the optically active region of the electrically tunable optical phase modulation element 200. In some embodiments, a difference between a reflectance of the electrically tunable optical phase modulation element 200 at the first region A1 and a reflectance of the electrically tunable optical phase modulation element 100 at the second region A2 is less than 0.1. For example, in the present embodiments, a combination of the substrates 210 and 220, the liquid crystal layer 230, the patterned transparent conductive layer 240, the transparent layer 250, the compensation layer 260, the compensation layer 270, the counter transparent conductive layer 280, and other layers (e.g., alignment layers) at different locations (e.g., the regions A1 and A2) have reflectances with a variation less than 0.1. Other details of the sixth embodiments are similar to those aforementioned, and not repeated herein.

Figure 10:
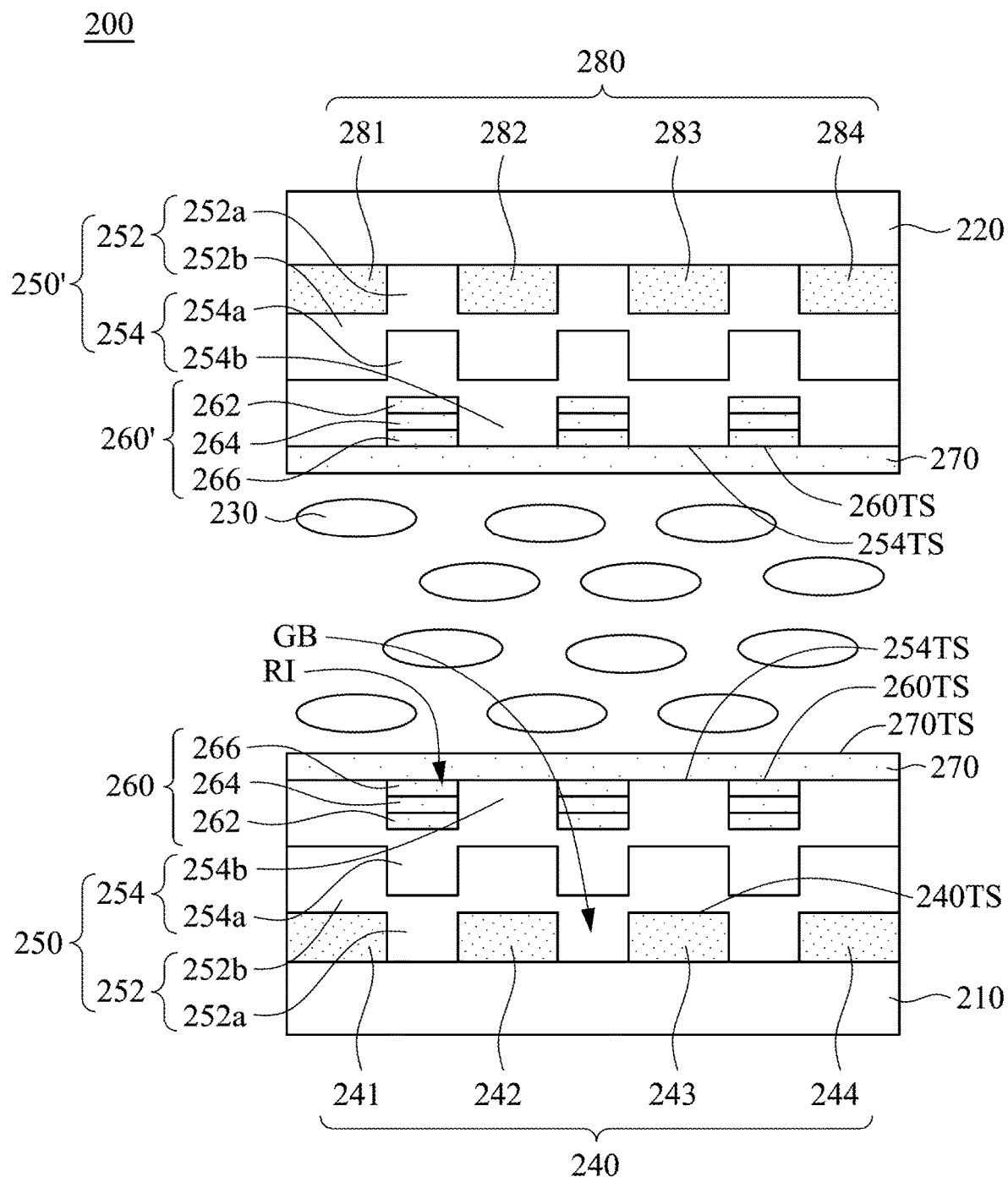
FIG. 10 is a schematic cross-sectional view of an electrically tunable optical phase modulation element according to an eighth embodiment of the disclosure.

FIG. 10 is a schematic cross-sectional view of an electrically tunable optical phase modulation element 100 according to a eighth embodiment of the disclosure. The eighth embodiment is similar to the seventh embodiment of FIG. 9, and the difference between the eighth embodiment and the seven embodiments of FIG. 9 is that: in the eighth embodiment, the counter transparent conductive layer 280 is patterned, and the electrically tunable optical phase modulation element 200 further includes a transparent layer 250' and a compensation layer 260' on the substrate 220.

To be specific, the patterned transparent conductive layer 280' may have portions (i.e., electrodes 281-284) spaced apart from each other. The transparent layer 250' has portions 254*b* corresponding to the electrodes 281-284. The compensation layer 260' is in between two adjacent portions (i.e., portions 254*b*) of the transparent layer 250. A flat surface 260TS of the compensation layer 260' is coplanar with a surface 254TS of the portions 254*b* of the transparent layer 250 adjacent the liquid crystal layer 230. In some embodiments, another compensation layer 270 may be optionally formed over the flat surface 260TS of the compensation layer 260' and the surface 254TS of the transparent layer 1250', and therefore has a flat surface 270TS. The structural and material configuration of the elements (e.g., the transparent layer 250, the compensation layer 260', and the compensation layer 270) on the substrate 220 is substantially the same as that of the elements (e.g., the transparent layer 250 the compensation layer 260, and the compensation layer 270) on the substrate 210, and therefore not repeated herein. Other details of the third embodiment are similar to those aforementioned, and therefore not repeated herein.

Based on the above discussions, it can be seen that the present disclosure offers advantages over liquid crystal devices. It is understood, however, that other embodiments may offer additional advantages, and not all advantages are necessarily disclosed herein, and that no particular advantage is required for all embodiments. One advantage is that a diffraction effect is reduced by reducing the effective refractive index difference at different positions. Another advantage is that the diffraction effect is further reduced by flattening the surface adjacent to the liquid crystal layer.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electrically tunable optical phase modulation element, comprising:
   a first substrate;
   a second substrate opposite to the first substrate;
   a liquid crystal layer between the first substrate and the second substrate;
   a patterned transparent conductive layer between the first substrate and the liquid crystal layer, wherein the patterned transparent conductive layer has a first electrode and a second electrode spaced apart from each other;
   a transparent layer between the patterned transparent conductive layer and the liquid crystal layer, wherein the transparent layer has a first portion, a second portion, and a third portion connecting the first portion of the transparent layer to the second portion of the transparent layer wherein the first and second portions of the transparent layer are directly over the first and second electrodes of the patterned transparent conductive layer, respectively, and the third portion of the transparent layer is at least partially between the first electrode and the second electrode; and
   a first metal-containing compound compensation layer in between the first portion and the second portion of the transparent layer, wherein the first metal-containing compound compensation layer has a flat surface adjacent the liquid crystal layer, and the flat surface of the first metal-containing compound compensation layer is coplanar with a surface of the transparent layer adjacent the liquid crystal layer.

2. The electrically tunable optical phase modulation element of claim 1, further comprising:
   a second metal-containing compound compensation layer over the first metal-containing compound compensation layer and the transparent layer.

3. The electrically tunable optical phase modulation element of claim 2, wherein a layer of the first metal-containing compound compensation layer adjacent to the second metal-containing compound compensation layer is made of a material different from that of the second metal-containing compound compensation layer.

4. The electrically tunable optical phase modulation element of claim 2, wherein a layer of the first metal-containing compound compensation layer adjacent to the second metal-containing compound compensation layer is made of a material the same as that of the second metal-containing compound compensation layer.

5. The electrically tunable optical phase modulation element of claim 2, wherein the first metal-containing compound compensation layer and the second metal-containing compound compensation layer have an interface therebetween, and the interface is coplanar with the surface of the transparent layer adjacent the liquid crystal layer.

6. The electrically tunable optical phase modulation element of claim 1, wherein a surface of the first portion of the transparent layer is coplanar with a surface of the second portion of the transparent layer.

7. The electrically tunable optical phase modulation element of claim 1, wherein the first metal-containing compound compensation layer comprises a plurality of layers, and at least two layers of the first metal-containing compound compensation layer have different refractive indexes.

8. The electrically tunable optical phase modulation element of claim 1, wherein a difference between refractive indices of the first metal-containing compound compensation layer and the patterned transparent conductive layer in an application wavelength range is less than 0.1.

9. The electrically tunable optical phase modulation element of claim 1, wherein the first substrate has a first region where the patterned transparent conductive layer is located and a second region where the patterned transparent conductive layer is not located, and a difference between a reflectance of the electrically tunable optical phase modulation element at the first region and a reflectance of the electrically tunable optical phase modulation element at the second region is less than 0.1.

10. The electrically tunable optical phase modulation element of claim 1, further comprising:
    an anti-mosaic layer between the liquid crystal layer and the first substrate.

11. The electrically tunable optical phase modulation element of claim 1, further comprising:
    a counter transparent conductive layer between the second substrate and the liquid crystal layer.

12. The electrically tunable optical phase modulation element of claim 1, wherein a bottommost portion of the surface of the transparent layer adjacent the liquid crystal layer is higher than a top surface of the first electrode.

13. The electrically tunable optical phase modulation element of claim 1, wherein the transparent layer is made of a dielectric material.

* * * * *